(12) United States Patent
Gupta et al.

(10) Patent No.: US 10,973,027 B2
(45) Date of Patent: Apr. 6, 2021

(54) DYNAMIC CARRIER MANAGEMENT AND NETWORK SLICING FOR INTERNET OF THINGS (IOT)

(71) Applicant: AT&T INTELLECTUAL PROPERTY I, L.P., Atlanta, GA (US)

(72) Inventors: Gaurav Gupta, Sammamish, WA (US); Rajendra Prasad Kodaypak, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 116 days.

(21) Appl. No.: 15/462,770

(22) Filed: Mar. 17, 2017

(65) Prior Publication Data
US 2018/0270820 A1 Sep. 20, 2018

(51) Int. Cl.
| | |
|---|---|
| *H04W 72/04* | (2009.01) |
| *H04W 64/00* | (2009.01) |
| *H04W 4/70* | (2018.01) |
| *H04W 24/02* | (2009.01) |
| *H04W 28/16* | (2009.01) |

(Continued)

(52) U.S. Cl.
CPC ......... *H04W 72/0453* (2013.01); *H04W 4/70* (2018.02); *H04W 24/02* (2013.01); *H04W 28/085* (2013.01); *H04W 28/16* (2013.01); *H04W 64/003* (2013.01); *H04W 24/08* (2013.01)

(58) Field of Classification Search
None
See application file for complete search history.

(56) References Cited

U.S. PATENT DOCUMENTS

| | | |
|---|---|---|
| 8,964,703 B2 | 2/2015 | Chen et al. |
| 9,356,725 B2 | 5/2016 | Vajapeyam et al. |

(Continued)

FOREIGN PATENT DOCUMENTS

| | | |
|---|---|---|
| EP | 2611250 | 7/2013 |
| WO | 2016089087 A1 | 6/2016 |

(Continued)

OTHER PUBLICATIONS

Bontu et al., "Wireless wide-area networks for Internet of things: An air interface protocol for IoT and a simultaneous access channel for uplink IoT communication." IEEE vehicular technology magazine 9.1 (2014): 54-63. Retrieved on Jan. 8, 2017, 10 pages.

*Primary Examiner* — Alex Skripnikov
(74) *Attorney, Agent, or Firm* — Amin, Turocy & Watson, LLP

(57) ABSTRACT

Critical radio resources can be intelligently and dynamically managed across traditional consumer mobility and Internet of things (IoT) services in an end-to-end manner. A selective offloading scheme based on monitored traffic dynamics can be utilized to ensure that IoT traffic is steered, on-demand, to a customized and/or dedicated core network slice, thereby enhancing consumer and IoT services experience. In one example, within the IoT domain, traffic can be steered to the customized and/or dedicated core network slice based on various factors, for example, device category and/or congestion per radio carrier, to minimize service disruptions and deliver superior mobility network functionality and/or end-user experience.

20 Claims, 12 Drawing Sheets

(51) Int. Cl.
*H04W 28/08* (2009.01)
*H04W 24/08* (2009.01)

(56) References Cited

U.S. PATENT DOCUMENTS

| | | | |
|---|---|---|---|
| 9,420,548 B2 | 8/2016 | Teague | |
| 2013/0322395 A1* | 12/2013 | Kazmi | H04W 72/082 |
| | | | 370/329 |
| 2014/0192659 A1* | 7/2014 | Tian | H04W 72/0453 |
| | | | 370/252 |
| 2015/0126207 A1* | 5/2015 | Li | H04W 16/14 |
| | | | 455/452.1 |
| 2016/0183261 A1* | 6/2016 | Koorapaty | H04W 28/085 |
| | | | 370/239 |
| 2016/0249358 A1 | 8/2016 | Li et al. | |
| 2016/0323870 A1* | 11/2016 | Wei | H04W 72/042 |
| 2016/0381528 A1 | 12/2016 | Lee et al. | |
| 2017/0230918 A1* | 8/2017 | Ryu | H04W 52/383 |

FOREIGN PATENT DOCUMENTS

| | | |
|---|---|---|
| WO | 2016122268 A1 | 8/2016 |
| WO | 2016200357 A1 | 12/2016 |

\* cited by examiner

– continued –

DYNAMIC CARRIER MANAGEMENT AND NETWORK SLICING FOR INTERNET OF THINGS (IOT)

TECHNICAL FIELD

The subject disclosure relates to wireless communications, e.g., dynamic carrier management and network slicing for Internet of things (IoT).

BACKGROUND

The Internet of things (IoT) holds a great promise for the future of the global communications industry. The connectivity of humans and machines (e.g., smart phones, tablet computers, home appliances, etc.) via high-speed mobile internet technologies such as Long Term Evolution (LTE), LTE-Advanced (LTE-A) and its evolution, forms the basis for a successful global IoT implementation. As the number of connected devices that are capable of establishing connectivity with other devices and/or passive objects to exchange data continues to rise steadily, IoT technology gains widespread proliferation in the information technology industry. IoT enables creation of an information-rich ecosystem that can enrich modern connected way of life and transform the way in which businesses as well as consumers function today. The ability to connect massive number of IoT devices creates new challenges for the network infrastructure providers to develop innovative and intelligent networking solutions that can deliver optimal connectivity and end user service quality.

Traffic in wireless networks has experienced phenomenal growth in the last decade. The predicted mobility traffic surge in the coming years is anticipated not only from traditional consumer/human-centric usage model, but also from a variety of machines (e.g., IoT devices) that will communicate with other machines and/or humans. In conventional network deployments, operators have leveraged their available spectrum allocations to offer a variety of mobility services. These services will evolve as new standards-based network capabilities are introduced in a phased manner. While the existing spectrum resources are utilized in a static manner to support such services, several enhancements as well as innovative solutions are possible when dedicating a portion of the existing deployed radio spectrum to IoT carriers. For example, a traditional 10 MHz long term evolution (LTE) carrier that is deployed today to serve consumer mobility traffic in a given geographic region may provide a certain set of metrics—capacity, sector data throughput, coverage, and user-experience. To meet the increasing mobility user traffic demands and alleviate radio congestion in dense urban environments, operators can add more radio carriers (ex: 10 MHz, 20 MHz) across multiple frequency bands depending on spectrum availability. However, traffic resulting from this carrier aggregation could potentially congest the core network. If a portion of these radio spectrum resources is allocated statically to serve IoT machine/device traffic as part of the radio network planning, system capacity for traditional consumer mobility traffic is reduced.

DETAILED DESCRIPTION

Figure 1:
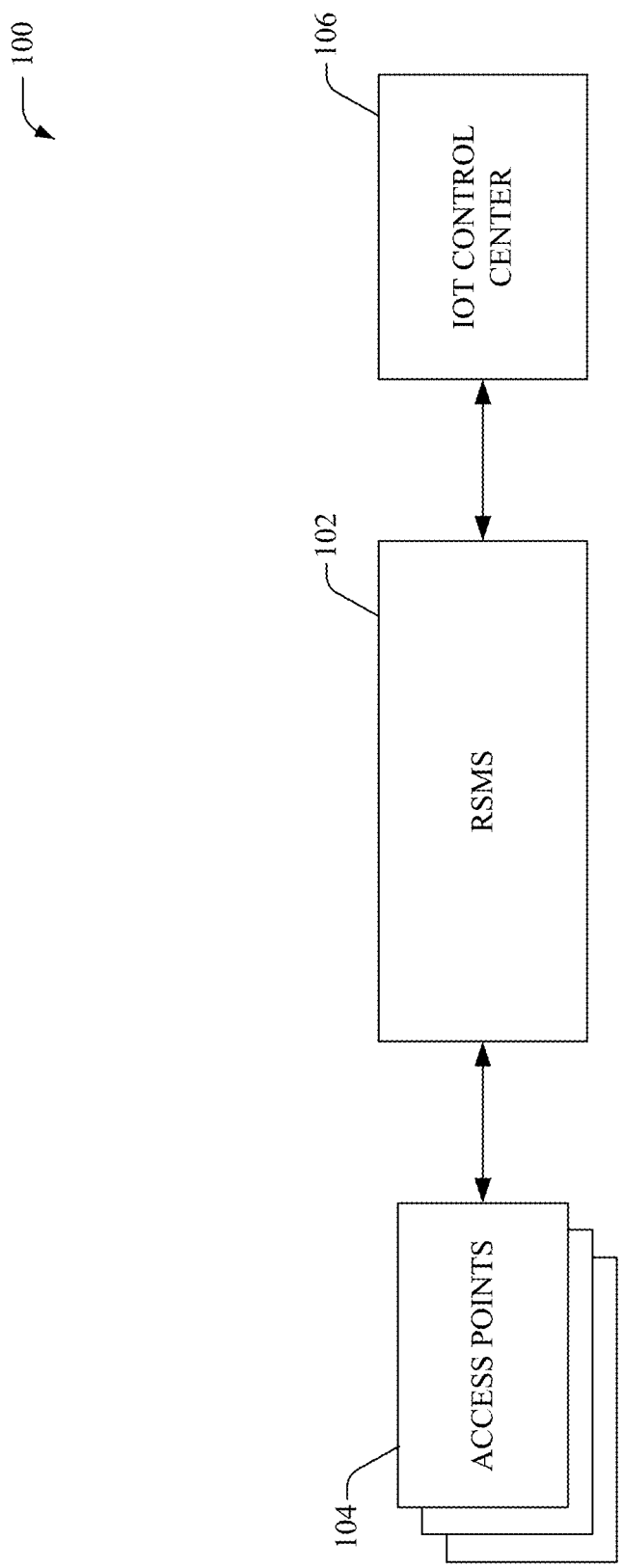
FIG. 1 illustrates an example system that facilitates dynamic carrier management and network slicing for Internet of things (IoT) devices.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," "engine," "center," "point," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

Aspects or features of the disclosed subject matter can be exploited in substantially any wired or wireless communication technology; e.g., Universal Mobile Telecommunications System (UMTS), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Fifth generation (5G), Zigbee, or another IEEE 802.XX technology, low power wide area (LPWA) and/or non-3GPP standard based solutions, such as, but not limited to, Ingenu, Sigfox, and/or LoRa, etc. Additionally, substantially one or more aspects of the disclosed subject matter can be exploited in legacy (e.g., wireline) telecommunication technologies.

High-speed wireless technology evolution based on LTE is a key component in the realization of a networked society where humans and machines that benefit from global mobile connectivity will be connected. Internet of Things (IoT) is the next industrial revolution that is poised to deliver such a connected world. As the number of connected devices that are capable of establishing connectivity with other devices and/or passive objects to exchange data continues to rise steadily over the high-speed mobile Internet, the IoT technology gains widespread proliferation in the information technology industry. The predicted mobility traffic surge in the coming years is anticipated not only from traditional consumer/human-centric usage model, but also from a variety of machines that will communicate with machines and/or humans. One or more aspects disclosed herein enable mobility networks to be ready and capable of handling such massive traffic volumes in an intelligent and dynamic manner.

In conventional LTE network deployments, operators have leveraged their available spectrum allocations to offer a variety of mobility services. These services evolve as new standards based network capabilities are introduced in a phased manner. While the existing spectrum resources are utilized in a static manner to support such services, several enhancements as well as innovative solutions are possible when dedicating a portion of the existing deployed radio spectrum to IoT carriers. For example, a traditional 10 MHz LTE carrier that is deployed today to serve consumer mobility traffic in a given geographic region may provide a certain set of metrics—capacity, sector data throughput, coverage, and/or user-experience. To meet the increasing mobility user traffic demands and alleviate radio congestion in dense urban environments, operators can add more LTE radio carriers (e.g., 10 MHz, 20 MHz, etc.) depending on spectrum availability. However, this could potentially congest the core network. If a portion of these radio spectrum resources are allocated statically to serve IoT machine/device traffic as part of the radio network planning, this will result in reduced system capacity for traditional consumer mobility traffic. Statically allocated radio resources in such multi-band and/or multi-carrier deployments may not be fully utilized at all times of the day across all regions. As a result, some urban regions where there may be higher demand for capacity can be impacted negatively if such static and unused resources are not dynamically re-allocated.

Systems and methods disclosed herein facilitate monitoring and managing radio resources utilization across traditional consumer traffic as well as IoT carrier traffic in conjunction with the core network. In one aspect, based on the dynamic spectrum and radio access network monitoring, IoT traffic can be intelligently steered to a specified network core slice for further call processing. Within the IoT domain, the traffic can further be steered, based on device category and/or congestion per radio carrier, to a dedicated core network slice to minimize service disruptions and/or deliver superior mobility network functionality and end-user experience.

Referring initially to FIG. 1, there illustrated is an example system 100 that facilitates dynamic carrier management and network slicing for IoT devices, according to one or more aspects of the disclosed subject matter. Radio spectrum is one of the most valuable assets for a mobile operator due to its scarcity and the significant growth in the mobile traffic and new class of IoT devices spanning many industry verticals. Accordingly, spectrum management is increasingly important to ensure optimal utilization of the available radio spectrum and efficient delivery of mobility services in a given area. System 100 can optimize the utilization of spectrum for different device types and can additionally (or optionally) optimize the utilization of network resources to serve IoT. In one aspect, system 100 facilitates dynamic spectrum management to control radio resource allocation, aggregation, and/or traffic offload in an intelligent manner (e.g., based on an analysis of real time and/or predefined data) to improve overall network and services design.

In order to launch IoT services rapidly, network operators plan to leverage their existing LTE network infrastructure as much as possible. The standards proposed new category of IoT devices, such as but not limited to, category M (CAT-M1) (also referred to as LTE-M) and/or narrowband (NB) (also referred to as NB-IoT, CAT-NB1 and/or LTE-NB1), are targeted to operate in limited channel bandwidths, for example, 1.4 MHz and/or 200 kHz, to offer IoT services. Such low radio bandwidth support can reduce overall device complexity and cost structure that has been targeted for massive IoT adoption. Conventional deployment strategies for IoT services are targeted mainly to leverage static allocations of narrowband channels that fall within an existing normal (e.g., 10 MHz) channel bandwidth. The normal (e.g., 10 MHz) channel, deployed by conventional carriers, serves consumer mobility traffic with a variety of triple/quad-play services. Allocation of a portion of this limited channel to serve IoT devices can have a negative impact on the consumer mobility traffic for example, in terms of capacity, coverage, throughput, and/or service experience. Additional LTE carriers can be added to aggregate the net spectrum resources to enhance the radio capacity, user data throughput, and/or support new services; however, since a portion of these radio resources is statically allocated to deliver IoT services, conventional network operators can lose an edge in terms of service revenues by nature of such deployments. In one aspect, system 100 can facilitate an intelligent and dynamic management of radio resources across traditional consumer mobility services and IoT services in an end-to-end manner. Moreover, system 100 can be utilized to facilitate selective offloading based on traffic dynamics to ensure that IoT traffic can be steered on-demand to an optimized and/or dedicated core network slice.

According to an embodiment, system 100 comprises a radio access network (RAN) spectrum management system (RSMS) 102 that can be utilized to manage spectrum utilization by different groups of devices (e.g., wherein devices in a group can belong to a defined type and/or category). For example, the RSMS 102 can determine (and/or control) one or more IoT specific carriers dedicated for IoT devices (e.g., CAT-M1 (1.4 MHz) and/or NB-IoT (200 kHz)) within a specified band across a RAN. Moreover, the RSMS 102 can dynamically allocate IoT carriers, for example, based on statistical information collected from one or more access points 104. As an example, access points 104 can comprise, but are not limited to, cellular access points (e.g., eNodeB (eNB), femto access point, pico access point, etc), WiFi access points, Bluetooth® access points, etc. In one aspect, the statistical information can comprise, but is not limited to resource allocation data (e.g., in terms of carrier utilization and/or the device type utilization). Based on an analysis of the statistical information, the RSMS 102 can dynamically allocate (e.g., update existing frequencies or allocate new frequencies) spectrum for a category of devices. Further, the RSMS 102 can provide the allocation data to the access points 104 and an IoT control center 106 that has direct connectivity to user equipment (UEs). In one aspect, the RSMS 102 can instruct the IoT control center 106 to provide the UE(s) with carrier frequencies that are to be utilized by the UE(s). On the receiving the instructions, the IoT control center 106 can provide the specified carrier frequency data to the UE(s). In one aspect, the RSMS 102 and the IoT control center 106 can be tightly synchronized with respect to the future additions of new and/or re-farmed licensed and/or unlicensed spectrum, wherein variants of LTE/LTE-A (LAA)/5G etc. when deployed can be used effectively for a broad range of IoT services (narrowband and/or broadband) in conjunction with traditional cellular services.

In one aspect, the RSMS 102 can also map different carriers to different core network slices. Moreover, the RSMS 102 can provide information regarding the mapping of the different carriers to the different core network slices, to the access points 104, which in turn can utilize the information to steer communication received via a specified carrier to a specified core network slice. Typically, IoT devices can have different characteristics than regular UEs (e.g., non-IoT devices, such as smart phones, tablet computers, personal computers, etc.). For example, IoT devices collectively generate a much greater number of signaling connections in the mobile core network as compared to regular UEs. Further, in another example, the service provider often performs simultaneous device triggering and monitoring for targeted IoT applications and services. Furthermore, in yet another example, IoT devices in a particular area can be switched off for long periods of time and can simultaneously (or substantially simultaneously) turn on and communicate via the network. Accordingly, providing a dedicated core network slice to handle devices of a specific category can enable the core network to efficiently deal with the IoT devices communication (and/or billing).

Figure 2:
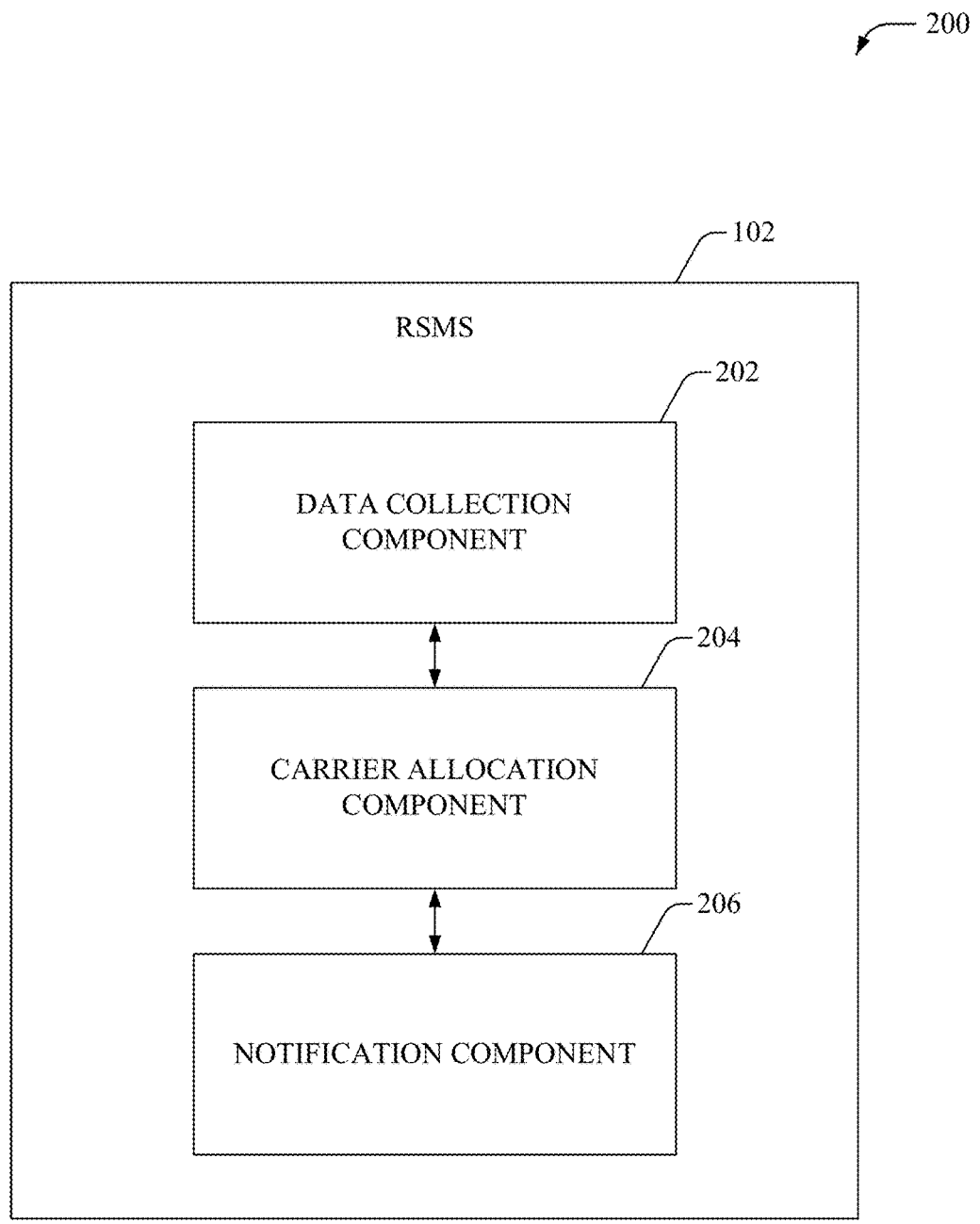
FIG. 2 illustrates an example system for dynamic spectrum management and traffic steering.

Referring now to FIG. 2, there illustrated is an example system 200 for dynamic spectrum management and traffic steering, in accordance with an aspect of the subject disclosure. Traditionally, radio resources are allocated statically. Moreover, once allocated, the radio resources cannot be released (and/or reallocated to different category of devices), for example, when determined that the devices are not using the radio resources. In contrast, the RSMS 102 can dynamically allocate spectrum resources and dynamically map respective carriers to different core network slices. It is noted that the RSMS 102 can comprise functionality as more fully described herein, for example, as described above with regard to system 100.

According to an aspect, access points (e.g., access points 104) can monitor radio access network utilization by different device types (e.g., commercial UEs, CAT-M1 devices, NB-IoT device, unique devices that support WiFi and LTE, fixed wired access devices, etc.). A data collection component 202 can receive the monitored data, for example, periodically, in response to an event (e.g., change in resource utilization), on-demand, at a specified time, during idle periods, etc. As an example, the data collection component 202 can receive data indicative of respective geographical locations of the access points, user density (e.g., how many IoT devices are located in the coverage area of an access point, how many non-IoT devices are located within the coverage area, etc.), data usage (e.g., an amount of data being communicated via CAT-3/4 devices, an amount of data being communicated by CAT-M1 devices, an amount of data being communicated by NB-IoT devices, etc), and the like. In one aspect, the data collection component 202 can aggregate instantaneous utilization of spectrum resources across a wide variety of regions and can manage other access points besides (and/or in addition to) cellular access points, such as, but not limited to, Bluetooth® access points, WiFi access points, etc. In one aspect, the RSMS 102 can comprise a database (not shown) of all frequency bands that are allocated across a given serving region.

In one embodiment, a carrier allocation component 204 can be utilized to analyze the monitored data (e.g., received by the data collection component 202) to determine spectrum allocation information utilized to facilitate dynamic resource allocation. As an example, the carrier allocation component 204 can allocate a new carrier frequency band for a specific category of devices (e.g., based on high demand or usage of spectrum resources), reallocate spectrum for the specific category of devices (e.g., based on a change in demand or usage of spectrum resources), and/or release spectrum allocated to the specific category of devices (e.g., if spectrum is determined to be unused). In one aspect, during peak hours of commercial mobile traffic (e.g., traffic from/to CAT-3/4 devices), the carrier allocation component 204 can consolidate all IoT traffic to only one carrier (e.g., in extreme conditions). For example, during peak hours of commercial mobile traffic, the RSMS 102 can intentionally reduce IoT traffic through managing power saving mode (PSM) timers for IoT devices, by which IoT devices wake-up during off-peak hours for commercial mobile traffic and sleep (e.g., operate in low-power modes) during peak hours for commercial mobile traffic. It is noted that the carrier allocation component 204 can specify different spectrum allocations for access points (e.g., eNBs) in different regions, for example, based on different device characteristics in the different regions. For example, in an urban downtown region, parking meters can be allocated to a frequency band f1, whereas in a rural area, smart water meters can be allocated to the frequency band f2.

Further, the carrier allocation component 204 can also determine mapping of carrier frequencies to different core network slices. In one aspect, based on an analysis of the monitored data (e.g., received by the data collection component 202), the carrier allocation component 204 can designate a core network slice, to which traffic received (by an access point) over a specific set of frequencies is to be steered. According to an aspect, a notification component 206 can transfer to a specific access point, information indicative of the mapping of carrier frequencies to the different core network slices.

Further, the notification component 206 can be utilized to transmit the spectrum allocation information to the access points and/or an IoT control center (e.g., IoT control center 106). The notification component 206 can instruct the IoT control center to inform UEs (e.g., belonging to a specific device category) about changes in carrier frequency allocations. Accordingly, the UEs can utilize the allocated carrier frequencies to communicate with a serving access point.

Figure 3:
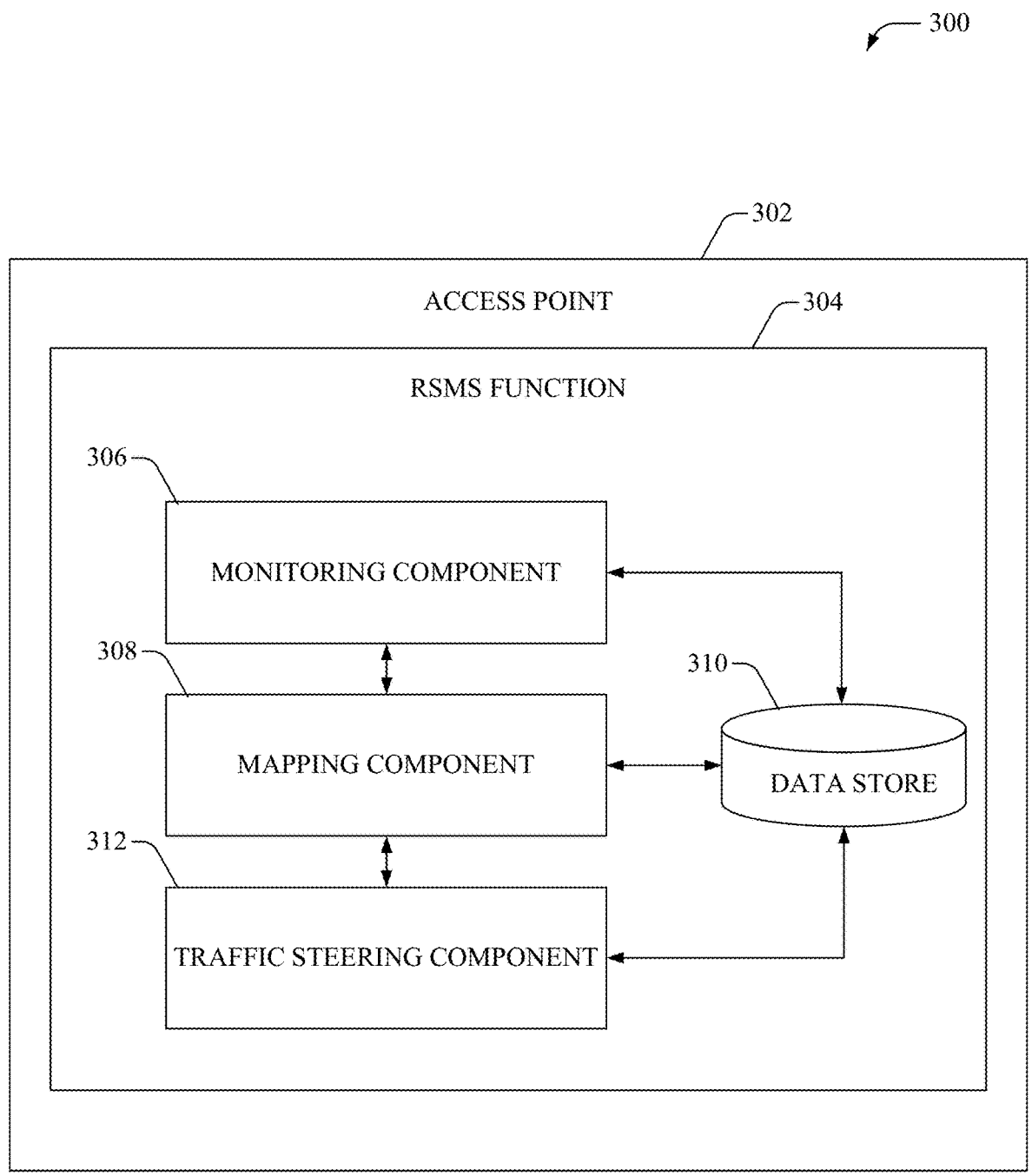
FIG. 3 illustrates an example system for implementing dynamic spectrum allocation and traffic steering.

Referring now to FIG. 3, there illustrated is an example system 300 for implementing dynamic spectrum allocation and traffic steering, in accordance with an aspect of the subject disclosure. System 300 can comprise access point 302 that is substantially similar to access points 104 and can comprise functionality as more fully described herein, for example, as described above with regard to access points 104. According to an aspect, the access point 302 can comprise a RSMS function 304 that communicates with a RSMS (e.g., RSMS 102) to facilitate dynamic spectrum allocation and dynamic traffic steering. The RSMS function 304 comprises a monitoring component 306 that can determine loading statistics associated with the access point 302. As an example, the loading statistics can comprise, but are not limited to, a number of UEs (e.g., associated with a defined category, having defined characteristics/functions, etc.) that currently coupled to the access point 302, the resource usage (e.g., bandwidth, throughput, etc.) by the different categories of devices coupled to the access point 302, etc. The loading statistics can be stored within a data store 310 and the RSMS function 304 can transfer the loading statistics to the RSMS server (e.g., periodically, and/or in response to a detecting a change in the loading statistics), which can analyze the loading statistics to allocate spectrum resources and core network slices.

Conventional networks are monolithic, wherein traffic from all types of devices is directed from the access point to the same pipeline within the core network. This traditional architecture does not allow management of and/or prioritizing traffic from critical devices and/or emergency services. In contrast, system 300 enables management of multiple carriers and steering traffic received via the carriers to different network slices that are managed dynamically. This allows for maintaining a separate revenue stream for IoT services in the shared revenue model. Network slicing creates logically separate slices of the core network entities running on common mobility infrastructure, wherein each slice can provide customized connectivity. In one aspect, core network slices cab be generated based on various techniques, such as, but not limited to, software-defined networking (SDN) and/or network functions virtualization (NFV).

In one aspect, a mapping component 308 can receive the traffic steering instructions from the RSMS 102, generate a mapping of the carrier frequencies to the designated core network slices, and store the mapping within the data store 310. For example, the mapping component 308 can map IoT carriers to respective S1 interfaces towards respective mobility core entities, such that all traffic received on a specific IoT carrier is steered to the mapped core network slice. In an example scenario wherein the access point 302 operates in 800 MHz, the mapping component 308 can allocate following NB-IoT carriers towards different slices of the core network: 812.1 MHz NB-IoT devices (e.g., serving smart cities), 820.2 MHz NB-IoT devices (e.g., serving factories), 816.3 MHz NB-IoT devices (e.g., serving retail businesses). In an aspect, the mapping of a carrier to S1 interface (S1-MME, S1-U) depends on the type of carrier and devices served by the carrier. As an example, NB-IoT devices supporting non-Internet protocol (IP) data delivery (NPDD) do not utilize S1-U interface to the core network and thus, network core can be further optimized. It is noted that the mapping between IoT carrier frequencies and core network slices can be one-to-one, one-to-many, many-to-one, and/or many-to-many as determined by the RSMS 102 for the access point 302.

According to an embodiment, the traffic steering component 312 can receive communications from UEs (not shown) coupled to the access point 302 via different carrier frequencies and can direct the traffic to an appropriate core network slice based on the mapping stored within the data store 310. This selective offloading scheme, based on monitoring the dynamics of traffic on the carriers, enables efficient steering the traffic to a specific core network slice that has been customized to deliver a superior IoT and/or mobile broadband service experience. As an example, the core network slices can be logically separated and isolated systems that can be designed with different architectures customized to handle different services. For example, a first core network slice can be designed for providing services to CAT-3/4 devices; a second core network slice can be designed for providing services to CAT-M1 devices; a third core network slice can be designed for providing services to NB-IoT devices, etc. In another example, a network slice can be designed to handle services by a specific service provider such that the traffic through the entire slice can be billed to the service provider.

It is noted that the data store 310 can comprise volatile memory(s) or nonvolatile memory(s), or can comprise both volatile and nonvolatile memory(s). Examples of suitable types of volatile and non-volatile memory are described below with reference to FIG. 11. The memory (e.g., data stores, databases) of the subject systems and methods is intended to comprise, without being limited to, these and any other suitable types of memory.

Figure 4:
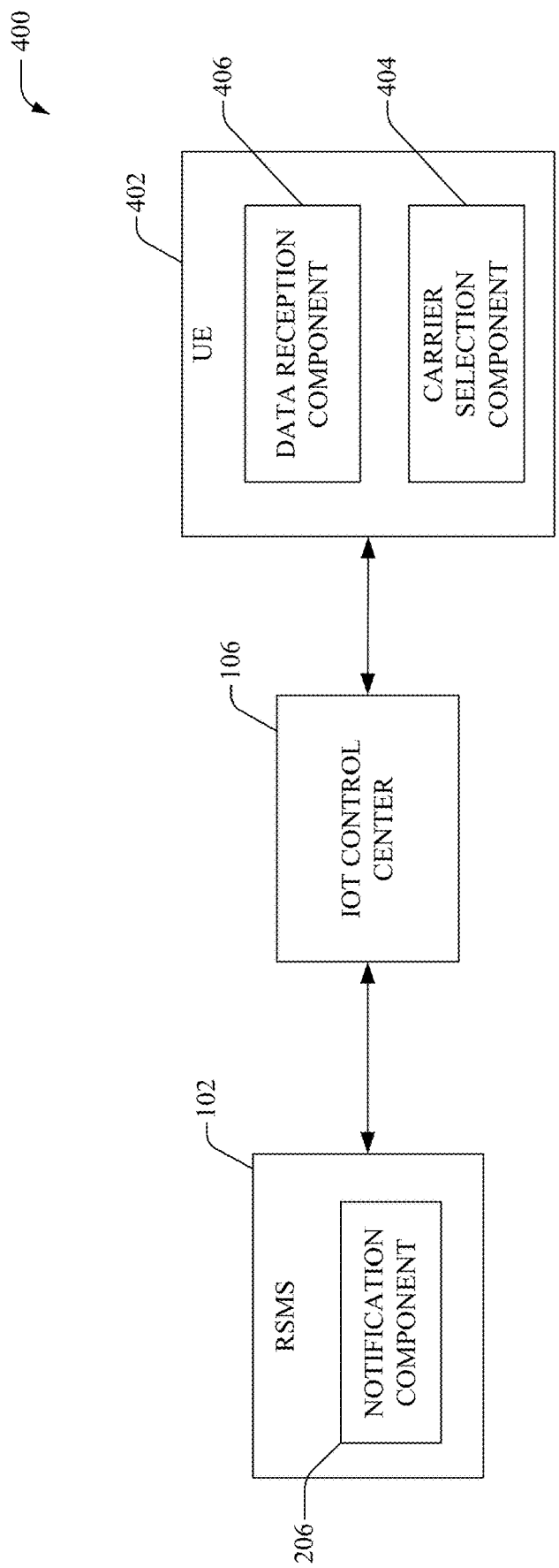
FIG. 4 illustrates an example system for controlling carrier frequency utilization of a user equipment (UE).

Referring now to FIG. 4, there illustrated is an example system 400 for controlling carrier frequency utilization of a UE, according to an aspect of the subject disclosure. It is noted that the RSMS 102, IoT control center 106, and notification component 206 can comprise functionality as more fully described herein, for example, as described above with regard to systems 100-300. In one embodiment, the RSMS 102 can determine spectrum allocation data that defines allocation of frequencies for a specific category of devices based on real-time (or near real-time) spectrum utilization monitored via one or more access points (e.g., access points 104). The notification component 206 can provide the spectrum allocation data to the IoT control center 106, which can forward the spectrum allocation data to a UE 402 (e.g., that belongs to the specific category). As an example, the UE can comprise, but is not limited to most any industrial automation device and/or consumer electronic devices, for example, a tablet computer, a digital media player, a wearable device, a digital camera, a media player, a cellular phone, a personal computer, a personal digital assistant (PDA), a smart phone, a laptop, a gaming system, set top boxes, home security systems, an IoT device, a connected vehicle, at least partially automated vehicle (e.g., drones), etc.

Typically, multiple carrier frequencies are available for the UE 402 to communicate with the network (e.g., via access point 104). While attaching to the network for first time (e.g., on power-up, waking up from a sleep/low power mode, and/or on initiation of a service request), a carrier selection component 404 of the UE 402 can select a preferred (or default) carrier frequency to communicate with the network. Once the UE 402 has connected to the network, the IoT control center 106 can transmit spectrum allocation data to the UE 402. As an example, the IoT control center 106 can determine a type of the UE 402 (e.g. CAT-3/4. CAT M1, NB-IoT device, device associated with service provider A, device associated with service provider B, etc.) and provide the UE 402 carrier frequency data representing a carrier frequency that has been allocated to that type of devices (e.g., based on load information of the access point serving the UE 402).

A data reception component 406 of the UE 402 can receive the carrier frequency data (e.g., on power-up and/or a change in the carrier allocation) and the carrier selection component 404 can re-tune the UE 402 to utilize the new carrier frequency for subsequent communications with the access point. In one example, the IoT control center 106 can pre-allocate spectrum for NB-IoT devices (e.g., UE 402) devices based on device location and/or aggregated time to wake-up (e.g., power saving mode timer expiry) of the IoT devices in a given geographical region.

Figure 5:
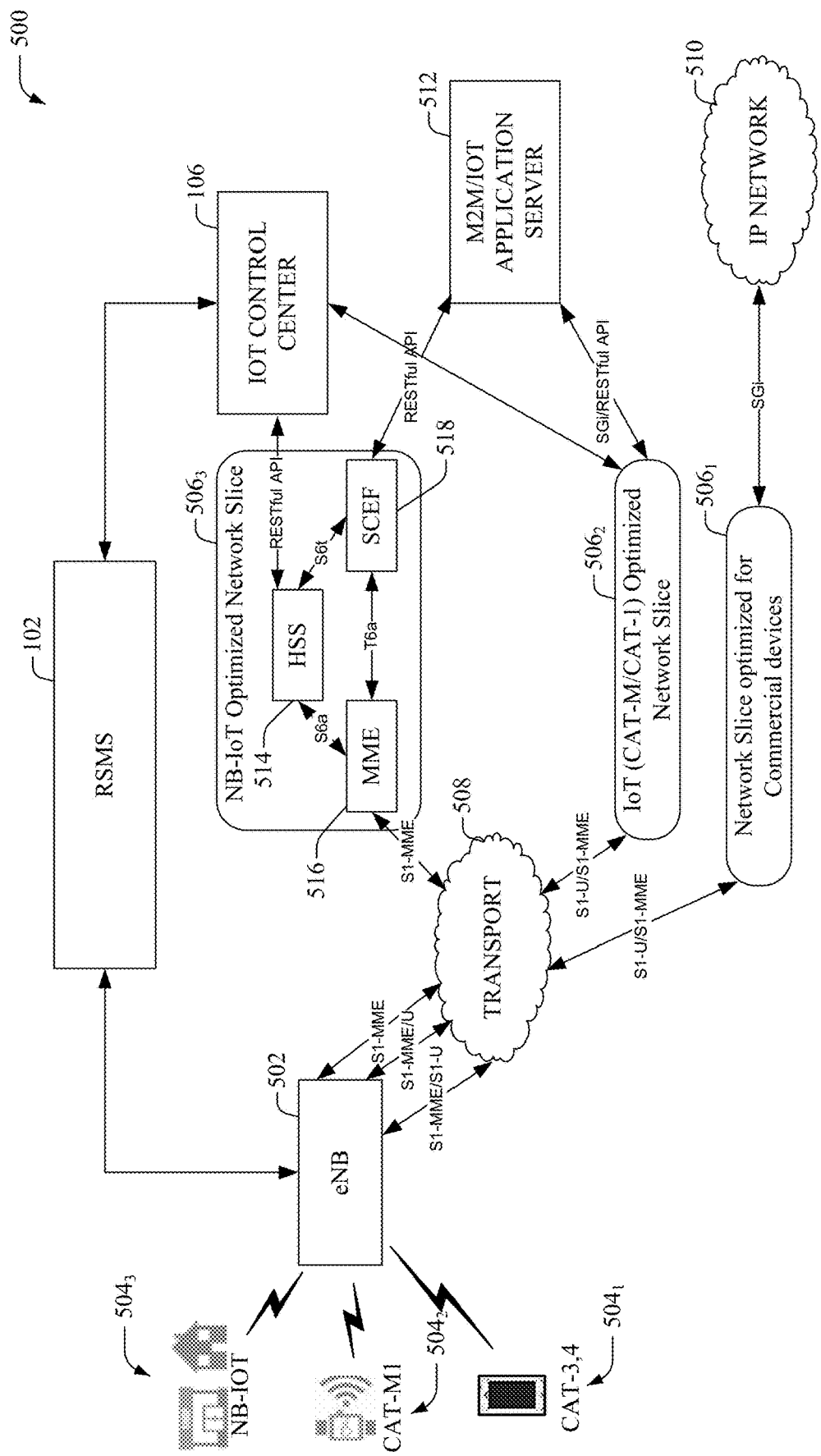
FIG. 5 illustrates an example system that facilitates dynamic spectrum allocation and traffic steering in a long term evolution (LTE) network.

FIG. 5 illustrates an example system 500 that facilitates dynamic spectrum allocation and traffic steering in an LTE network, according to aspects of the disclosed subject matter. In one aspect, the RSMS 102 and IoT control center 106 can comprise functionality as more fully described herein, for example, as described above with regard to systems 100-400. Further, eNB 502 can be substantially similar to access points 104 and/or access point 302 and can comprise functionality as more fully described herein, for example, as described herein with regard to access points 104 and/or access point 302. The eNB 502 can serve various UEs, such as, but not limited to, CAT-3/4 devices 504$_1$ (e.g., smart phone, tablet computers, digital readers, connected cars etc.), CAT-M1 devices 504$_2$, and/or NB-IoT devices 504$_3$. Moreover, the UEs (504$_1$-504$_3$) can be substantially similar to UE 402 and can comprise functionality as more fully described herein, for example, as described herein with regard to UE 402. Traditionally, an LTE carrier and IoT carrier(s) are statically allocated in the eNB and a common evolved packet core (EPC) network is utilized to support traffic from all the different categories of UEs. This traditional static approach is inefficient and can easily congest the RAN and/or EPC network. System 500 selectively offloads traffic from IoT devices (e.g., 504$_2$ and 504$_3$) from eNB 502 to an optimized network slice (e.g., 506$_2$ and 506$_3$) based on the IoT-carrier employed by the IoT devices.

Figure 6:
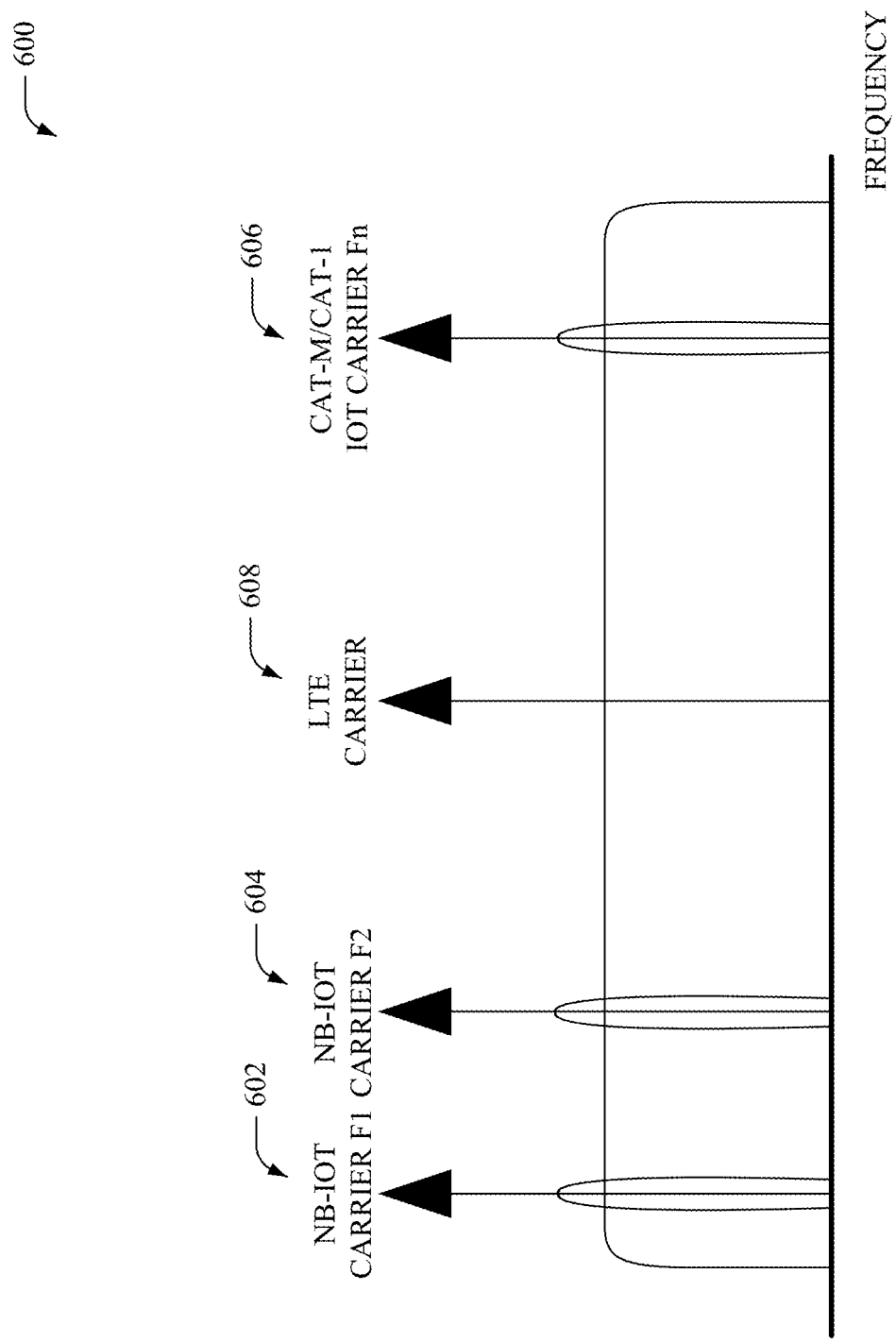
FIG. 6 illustrates an example frequency spectrum diagram that depicts a transmission of different carriers in a transmission band.

In an aspect, the eNB 502 can transmit the LTE carrier and multiple IoT (NB-IoT, CAT-M1) carriers in a given transmission band. FIG. 6 illustrates an example frequency spectrum 600 that depicts the transmission of the different carriers in the transmission band. In one example, multiple IoT carriers (602-606) can be allocated with the LTE carrier 608 within the transmission band. The allocation of the multiple IoT carriers (602-606) can be modified (e.g., by the RSMS 102) based on loading statistics of the eNB (and/or neighboring eNBs).

Referring back to FIG. 5, in one aspect, the eNB 502 can map each IoT carrier (602-606) to EPC via an S1 interface. The mapping can be one-to-one, one-to-many, many-to-one, and/or many-to-many, for example, as determined by the RSMS 102. In one example, for the LTE carrier (608), serving the CAT-3/4 devices 504$_1$, the eNB 502 can establish an S1-MME and S1-U interface to an EPC network slice 506$_1$ customized to handle traffic and/or services associated with the CAT-3/4 devices 504$_1$ (e.g., via the transport network 508). As an example, the EPC network slice 506$_1$ can be coupled to an IP network 510 via a SGi interface to establish communications associated with the CAT-3/4 devices 504$_1$. In another example, for the CAT-M1 carrier (606), serving the CAT-M1 devices 504$_2$, the eNB 502 can establish an S1-MME and S1-U interface to an EPC network slice 506$_2$ customized to handle traffic and/or services associated with the CAT-M1 devices 504$_2$ (e.g., via the transport network 508). As an example, the EPC network slice 506$_2$ can be coupled to a machine-to-machine (M2M)/IoT application server 512 via a SGi/RESTful API to establish communications associated with the CAT-M1 devices 504$_2$. Further, in yet another example, for the NB-IoT carrier (602 and/or 604), serving the NB-IoT devices 504$_3$ that utilize non-IP data delivery, the eNB 502 can establish an S1-MME to an EPC network slice 506$_3$ customized to handle traffic and/or services associated with the NB-IoT devices 504$_3$ (e.g., via the transport network 508). As an example, the EPC network slice 506$_3$ can be coupled to a machine-to-machine (M2M)/IoT application server 512 via a RESTful API to establish communications associated with the NB-IoT devices 504$_3$. The EPC network slices 506$_1$-506$_3$ can run on a shared EPC infrastructure, for example, comprising functional control plane components, such as, home subscriber server (HSS) 514, mobility management entity (MME) 516, and/or service capability exposure function (SCEF) 518. Although FIG. 5 depicts only three network slices, it is noted that the subject specification is not limited to three network slices and that greater or fewer number of network slices can be utilized. Further, the mapping of the carriers to the network slices can be updated dynamically based on instructions received from the RSMS 102.

According to an embodiment, the eNB 502 can transmit carrier load statistics to the RSMS 102 (e.g., periodically, during idle time periods, at a specified time, on-request, etc.). The RSMS 102 can aggregate load statistics from eNB 502 and other RAN nodes and perform analytics to determine appropriate IoT carriers that can be utilized by different device types. The RSMS 102 can provide the determined IoT carrier information to the IoT control center 106, which can supply the IoT carrier frequency to the IoT device (e.g., 504$_2$ and 504$_3$) in response to detecting that an attach and/or service request has been transmitted by the IoT device (e.g., 504$_2$ and 504$_3$). As an example, during the attach and/or service request, the IoT device (e.g., 504$_2$ and 504$_3$) can provide the eNB 502 information that is transferred to the IoT control center 106. On receiving the IoT carrier information from the IoT control center 106, the IoT device (e.g., 504$_2$ and 504$_3$) can store the IoT carrier information and utilize the newly allocated (and/or modified) carrier frequencies for subsequent radio communication. Accordingly, spectrum utilization for all device types and network resource utilization to serve IoT traffic can be optimized.

Although system 500 is described with respect to a LTE network, it is noted that the subject disclosure is not limited to LTE networks and can be utilized in most any communication network. As an example, the systems and methods disclosed herein can also be applied to low power wide area (LPWA) and/or non-3GPP standard based solutions, such as, but not limited to, Ingenu, Sigfox, and/or LoRa.

Figure 7:
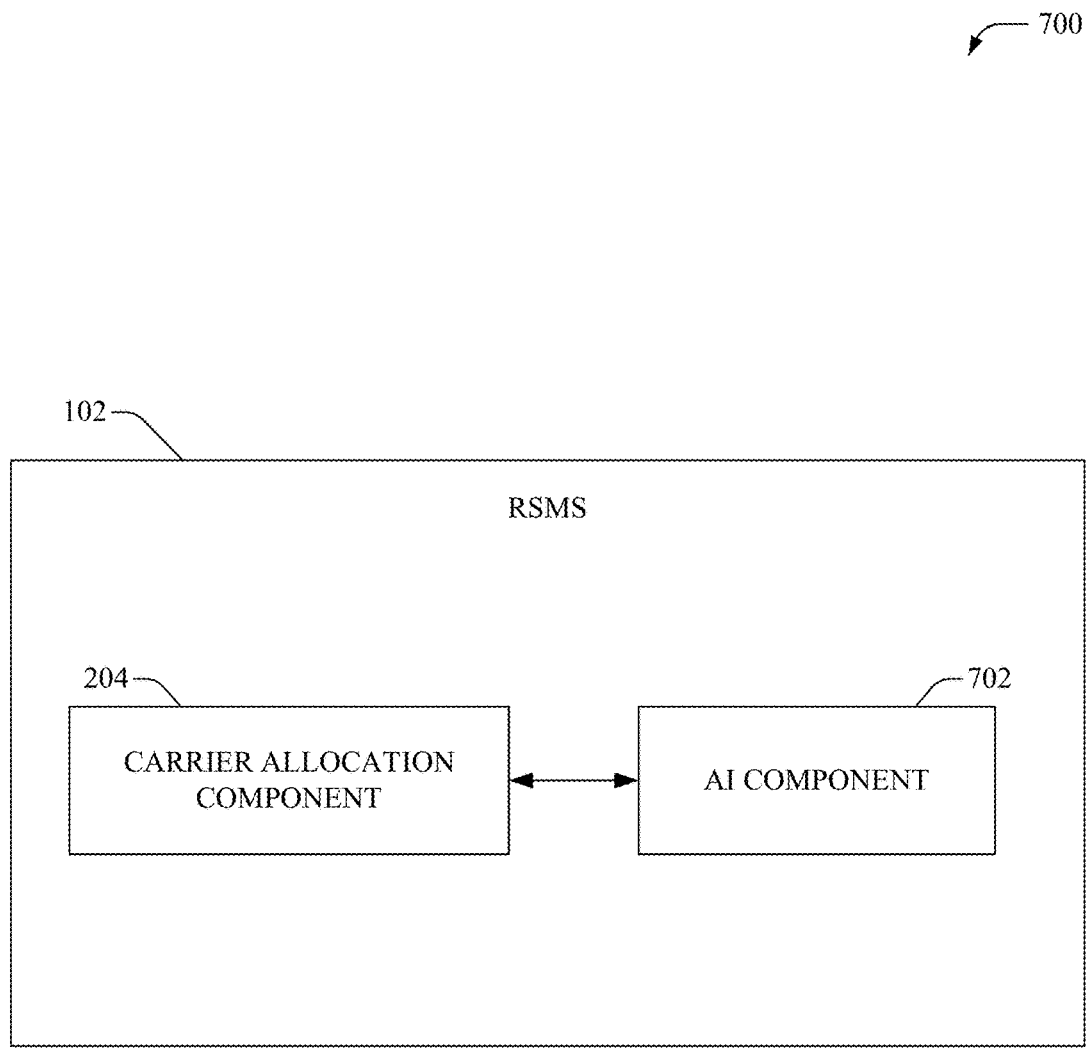
FIG. 7 illustrates an example system that facilitates automating one or more features in accordance with the subject embodiments.

Referring now to FIG. 7, there illustrated is an example system 700 that employs an artificial intelligence (AI) component (702) to facilitate automating one or more features in accordance with the subject embodiments. It can be noted that the RSMS 102 and carrier allocation component 204 can comprise functionality as more fully described herein, for example, as described above with regard to systems 100-600.

In an example embodiment, system 700 (e.g., in connection with automatically managing spectrum allocation and/or mapping multiple IoT carriers to core network slices) can employ various AI-based schemes (e.g., intelligent processing/analysis, machine learning, etc.) for carrying out various aspects thereof. For example, a process for determining which frequencies to allocate, determining frequencies to release and/or reuse, determining when to receive loading statistics from access points, determining a mapping of allocated carriers to core network slices, etc. can be facilitated via an automatic classifier system implemented by AI component 702.

Moreover, the AI component 702 can exploit various artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI component 702 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 702 can be used to automatically learn and perform a number of functions, comprising but not limited to determining according to a predetermined criteria, allocation of spectrum for IoT carriers, spectrum resources that are to be released, a time period for receiving loading statistics from access points, a mapping of allocated carriers to core network slices, etc. The criteria can comprise, but is not limited to, historical patterns and/or trends, network operator preferences and/or policies, application/service provider preferences, predicted traffic flows, event data, latency data, reliability/availability data, current time/date, and the like.

According to an embodiment, the network architecture and systems disclosed herein provides several non-limiting advantages and features such as, but not limited to, efficient spectrum utilization, wherein the disclosed systems optimize the utilization of spectrum for all device types and/or optimize use of network resources to serve IoT traffic. Further, the disclosed systems reduce cost of network operation. As an example, the disclosed systems dynamically manage network load from IoT devices and offer security, reliability, scalability, and/or availability. Moreover, a network-on-demand for IoT can be provided using a cloud infrastructure. By automating IoT carrier allocation within the band without affecting traffic from commercial users (e.g., non-IoT devices) during peak hours, network resiliency can be improved at a low cost. Moreover, during peak hours of commercial mobile traffic, the disclosed systems can consolidate all IoT traffic to only one carrier (e.g., in extreme conditions). Additionally, the disclosed systems enhance IoT device and user experience by providing best performance for all device types (e.g., IoT devices and commercial users). During peak hours of commercial traffic, the disclosed systems can intentionally reduce IoT traffic through managing PSM timers for IoT devices, by which IoT devices wake-up during off-peak hours for commercial traffic.

Figure 8:
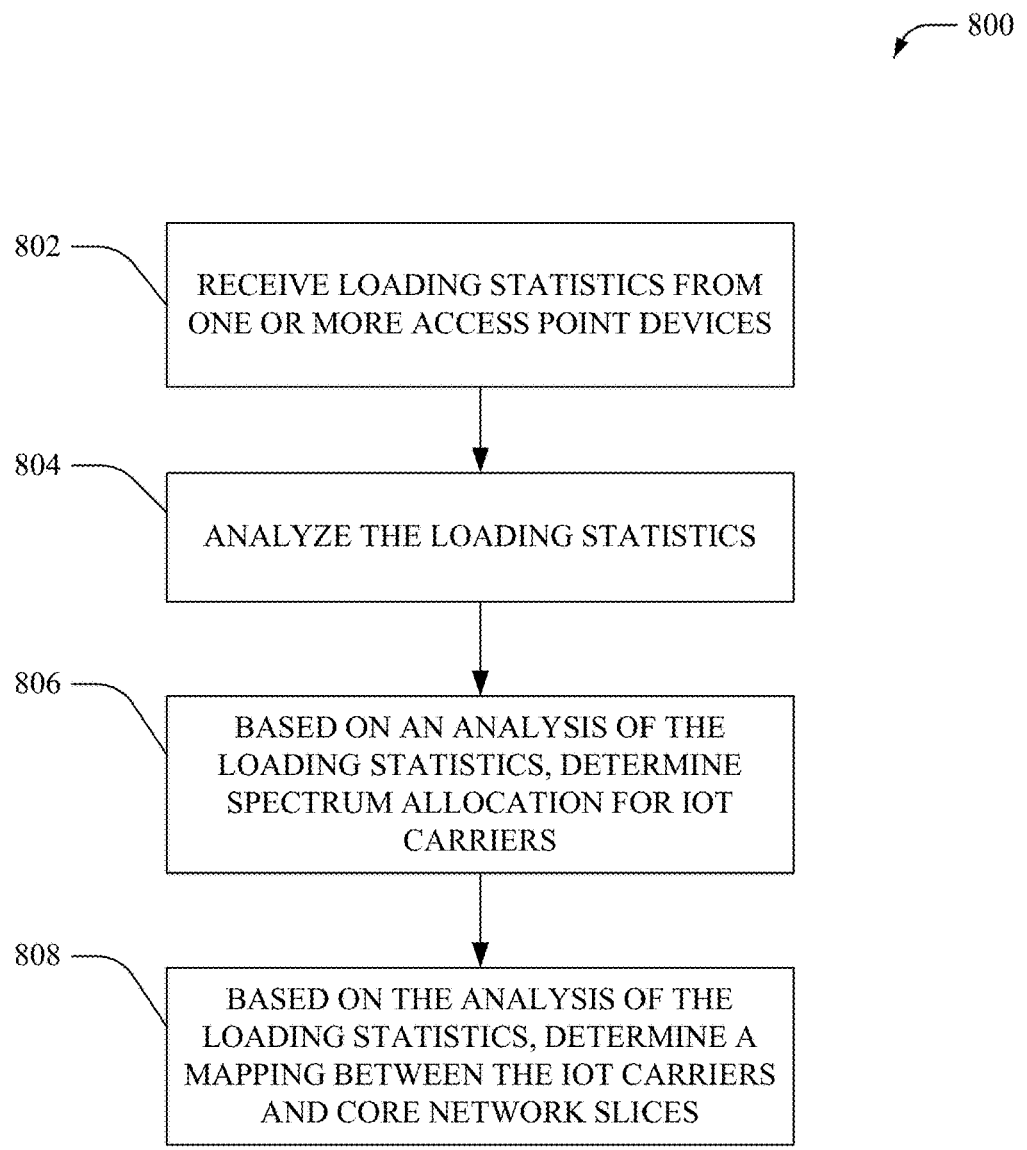
FIG. 8 illustrates an example method that facilitates dynamic carrier management and network slicing for IoT devices.
Figure 9:
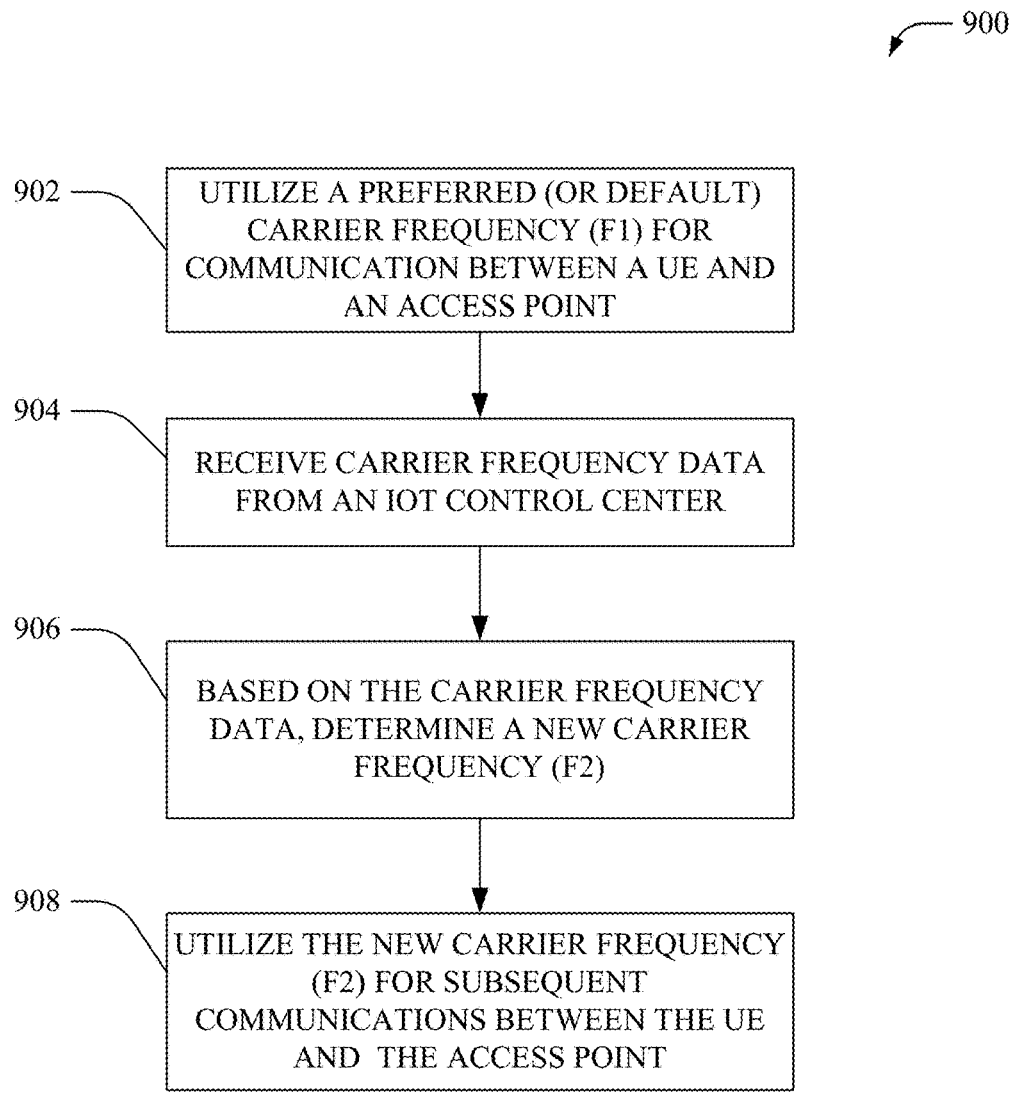
FIG. 9 illustrates an example method for re-tuning a carrier frequency utilized by a UE.
Figure 10:
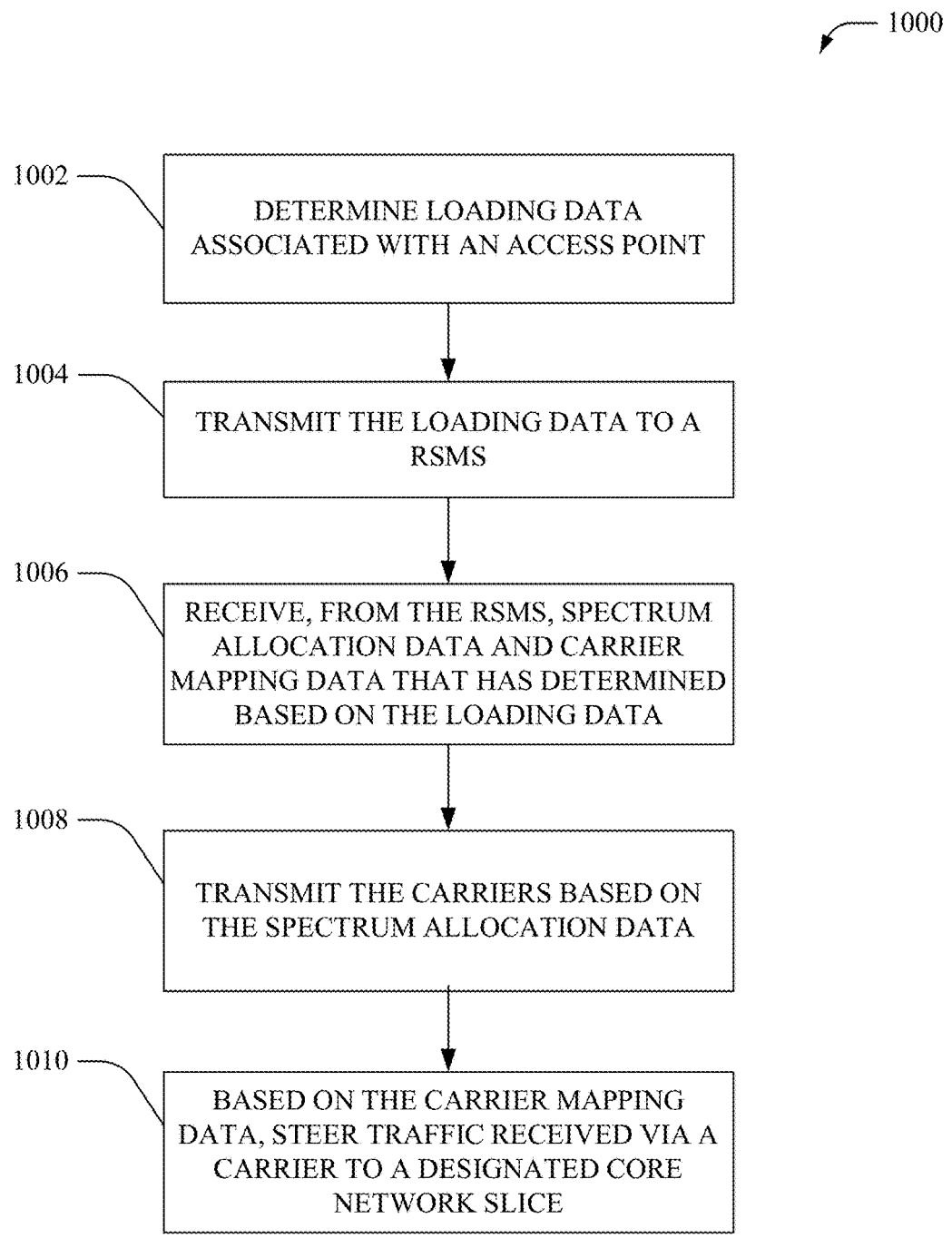
FIG. 10 illustrates an example method for dynamic spectrum allocation and traffic steering, according to an aspect of the subject disclosure.

FIGS. 8-10 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 8 there illustrated is an example method 800 that facilitates dynamic carrier management and network slicing for IoT devices, according to an aspect of the subject disclosure. In an aspect, method 800 can be implemented by one or more network devices (e.g., RSMS 102) of a communication network (e.g., cellular network). Method 800 can improve the utilization of spectrum for all device types and can additionally (or alternatively) improve the utilization of network resources to serve IoT devices. At 802, loading statistics can be received from one or more access points. As an example, the loading statics can comprise real-time (and/or near real-time) resource utilization (e.g., spectrum utilization, bandwidth utilization, throughput, etc.) of devices coupled to the one or more access points. At 804, the loading statistics can be analyzed. Further, at 806, based on the analysis of the loading statistics, spectrum allocation can be determined for IoT carriers. As an example, new (and/or modified) carrier frequencies can be allocated for a specific device type or service type. Furthermore, at 808, based on the analysis of the loading statistics, a mapping between the carrier frequencies and core network slices that have been customized for the traffic can be determined. As an example, the mapping can be utilized by the one or more access points to steer communication data received over a specific carrier frequency to one or more designated core network slices.

FIG. 9 illustrates an example method 900 for re-tuning a carrier frequency utilized by a UE, according to an aspect of the subject disclosure. As an example, method 900 can be implemented by a UE (e.g., UE 402) of a communication network (e.g., cellular network). At 902, a preferred (default and/or pre-provisioned) carrier frequency (f1) can be utilized for communication between the UE and an access point. At 904, carrier frequency data can be received from an IoT control center. As an example, the IoT control center can provide the carrier frequency data in response to determining that the UE has coupled to the access point and/or the UE has initiated a service request. In one aspect, the carrier frequency data can be determined (e.g., by a RSMS) based on loading statistics monitored by the access point. Further, at 906, a new carrier frequency (f2) can be determined based on the carrier frequency data. Furthermore, at 908, the new carrier frequency (f2) can be utilized for subsequent communications between the UE and the access point. Moreover, the UE can retune itself to transmit and/or receive data over different carrier frequencies, as instructed by a network device (e.g., the IoT control center).

FIG. 10 illustrates an example method 1000 for dynamic spectrum allocation and traffic steering, according to an aspect of the subject disclosure. As an example, method 1000 can be implemented by an access point (e.g., access point 104 and/or access point 302) of a communication network (e.g., cellular network). At 1002, loading data associated with the access point can be determined. As an example, loading data can comprise information, such as, but not limited to, data/resource usage by a category of devices coupled to the access point, the number of devices in each category, etc. At 1004, the loading data can be transmitted to a RSMS of the communication network. As an example, the RSMS can be deployed (completely or partially) within a RAN or a core network of the communication network. In one aspect, the RSMS can analyze the loading data received from the access point (and optionally one or more additional/neighboring access points) to determine spectrum allocation data and carrier mapping data. At 1006, the spectrum allocation data and carrier mapping data can be received from the RSMS. Further, at 1008, the carriers can be transmitted based on spectrum allocation data. Furthermore, at 1010, traffic received via a specific carrier can be steered to a core network slice that is selected based on the carrier mapping data.

Figure 11:
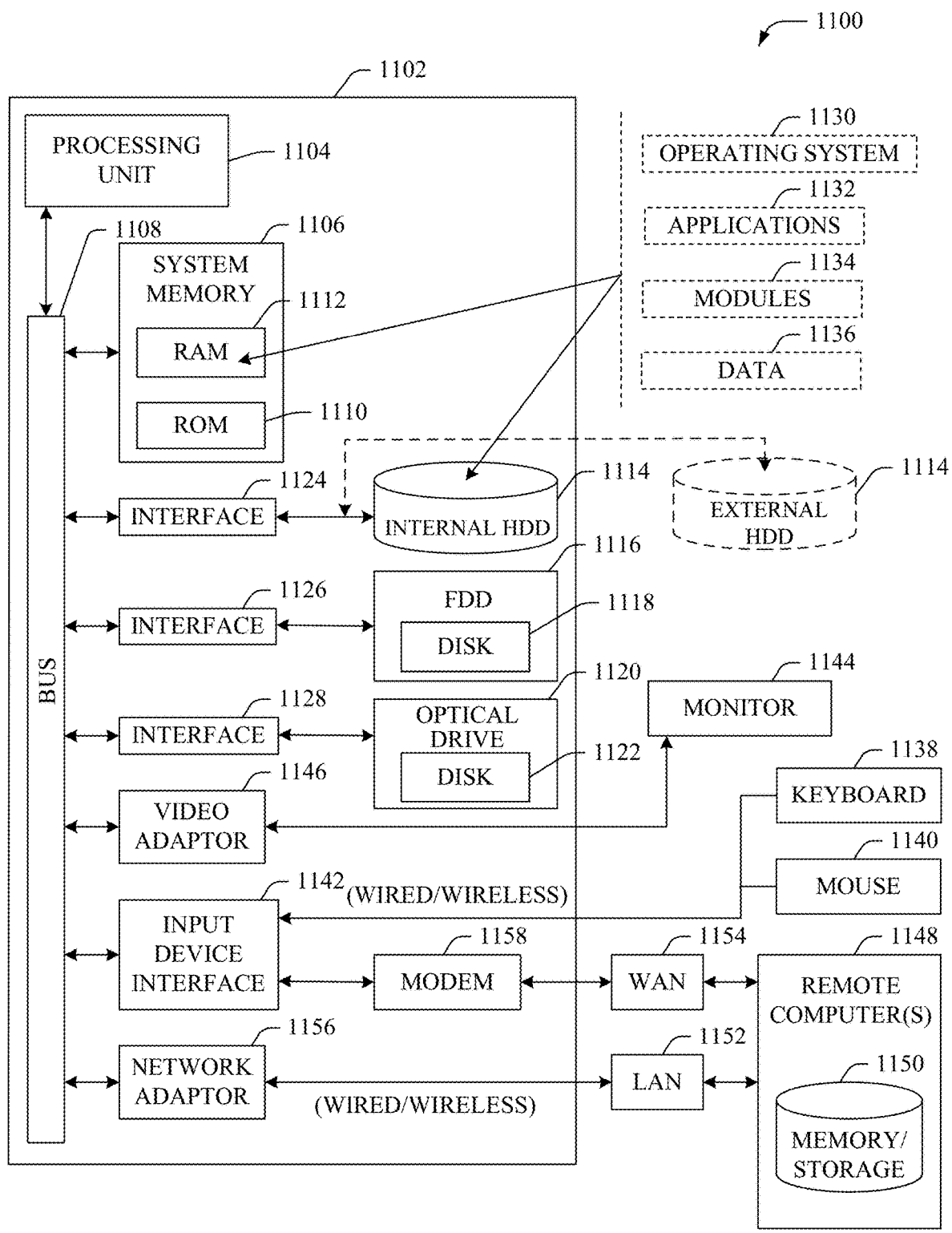
FIG. 11 illustrates a block diagram of a computer operable to execute the disclosed communication architecture.

Referring now to FIG. 11, there is illustrated a block diagram of a computer 1102 operable to execute the disclosed communication architecture. In order to provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 11, the example environment 1100 for implementing various aspects of the specification comprises a computer 1102, the computer 1102 comprising a processing unit 1104, a system memory 1106 and a system bus 1108. As an example, the component(s), application(s) server(s), equipment, system(s), interface(s), gateway(s), controller(s), node(s), engine(s), entity(ies), function(s), center(s), point(s) and/or device(s) (e.g., RSMS 102, IoT control center 106, access points 104, data collection component 202, carrier allocation component 204, notification component 206, access point 302, monitoring component 306, mapping component 308, data store 310, traffic steering component 312, UE 402, carrier selection component 404, data reception component 406, eNB 502, UEs ($504_1$-$504_3$), network slices ($506_1$-$506_3$), transport network 508, IP network 510, M2M/IoT application server 512, HSS 412, MME 516, SCEF 518, AI component 702, etc.) disclosed herein with respect to systems 100-700 can each comprise at least a portion of the computer 1102. The system bus 1108 couples system components comprising, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1114, which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. It is noted that the specification can be implemented with various commercially available operating systems or combinations of operating systems.

A user can enter commands and information into the computer 1102 through one or more wired/wireless input devices, e.g., a keyboard 1138 and/or a pointing device, such as a mouse 1140 or a touchscreen or touchpad (not illustrated). These and other input devices are often connected to the processing unit 1104 through an input device interface 1142 that is coupled to the system bus 1108, but can be connected by other interfaces, such as a parallel port, an IEEE 1394 serial port, a game port, a USB port, an infrared (IR) interface, etc. A monitor 1144 or other type of display device is also connected to the system bus 1108 via an interface, such as a video adapter 1146.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also comprise a wireless access point disposed thereon for communicating with the wireless adapter 1156.

When used in a WAN networking environment, the computer 1102 can comprise a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be noted that the network connections shown are example and other means of establishing a communications link between the computers can be used.

The computer 1102 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Additionally, the disclosed memory components of systems or methods herein are intended to comprise, without being limited to comprising, these and any other suitable types of memory.

Figure 12:
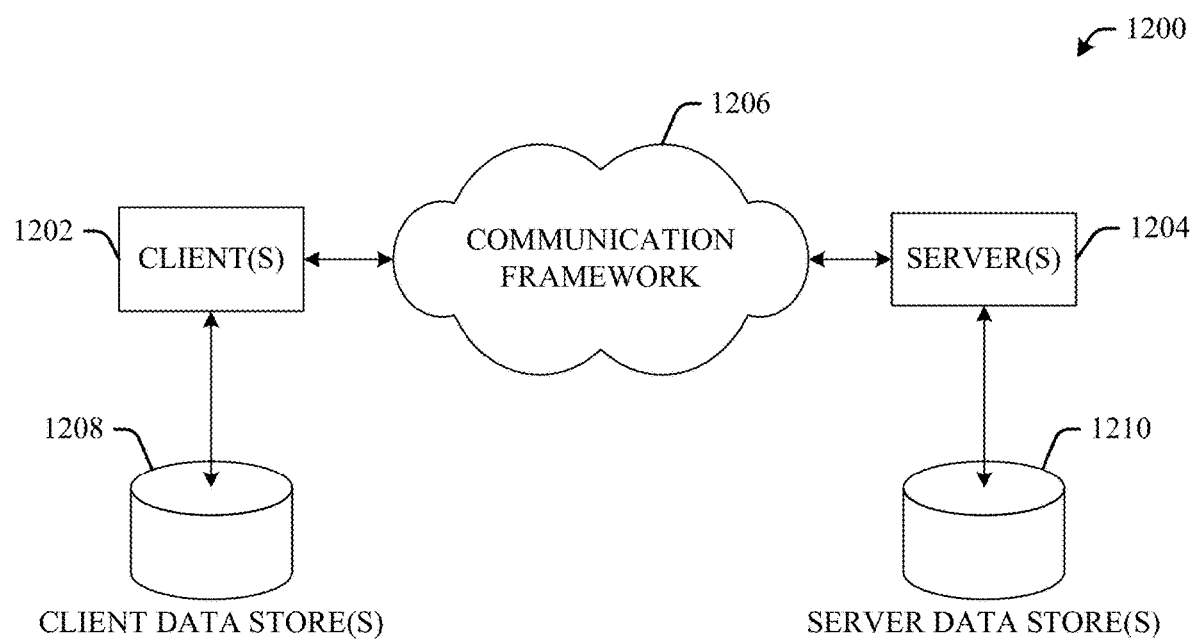
FIG. 12 illustrates a schematic block diagram of a computing environment in accordance with the subject specification.

Referring now to FIG. 12, there is illustrated a schematic block diagram of a computing environment 1200 in accordance with the subject specification. The system 1200 comprises one or more client(s) 1202. The client(s) 1202 can be hardware and/or software (e.g., threads, processes, computing devices).

The system 1200 also comprises one or more server(s) 1204. The server(s) 1204 can also be hardware and/or software (e.g., threads, processes, computing devices). The servers 1204 can house threads to perform transformations by employing the specification, for example. One possible communication between a client 1202 and a server 1204 can be in the form of a data packet adapted to be transmitted between two or more computer processes. The data packet may comprise a cookie and/or associated contextual information, for example. The system 1200 comprises a communication framework 1206 (e.g., a global communication network such as the Internet, cellular network, etc.) that can be employed to facilitate communications between the client(s) 1202 and the server(s) 1204.

Communications can be facilitated via a wired (comprising optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
      receiving statistical data that is determined based on monitoring usage data indicative of usage of access network resources by user equipment that are coupled to an access point;
      based on an analysis of the statistical data, determining spectrum allocation data that is employable to allocate respective carrier frequencies for groups of the user equipment, wherein the groups of the user equipment comprise a first group of the user equipment associated with a first category and a second group of the user equipment, different from the first group of the user equipment, associated with a second category, and wherein a first carrier frequency of the respective carrier frequencies are to be utilized by the first group of the user equipment and a second carrier frequency of the respective carrier frequencies are to be utilized by the second group of the user equipment to communicate with the access point; and reallocating spectrum from the second group of the user equipment to the first group of the user equipment based on a change in usage of the access network resources by the first group of the user equipment or the second group of the user equipment, wherein the statistical data is determined based on device density data that represents a density of a group of the groups of the user equipment, associated with the first category and the second category, that are determined to be coupled to the access point.

2. The system of claim 1, wherein the operations further comprise:

determining mapping data that is employable to map a carrier frequency of the respective carrier frequencies to a specified network slice associated with a communication network.

3. The system of claim 2, wherein the specified network slice is determined to have been customized to handle traffic associated with the carrier frequency.

4. The system of claim 2, wherein the operations further comprise:

facilitating a transmission of the mapping data to the access point to facilitate steering of traffic received via the carrier frequency to the specified network slice.

5. The system of claim 1, wherein the operations further comprise:

facilitating a transmission of a message to a first user equipment of the user equipment, and wherein the message comprises an instruction that instructs the first user equipment to utilize a specified carrier frequency of the respective carrier frequencies that corresponds to a category to which the first user equipment is determined to belong.

6. The system of claim 5, wherein the operations further comprise:

directing, to an internet of things control center device associated with a communication network, the spectrum allocation data that is employable to facilitate the transmission of the message from the internet of things control center device to the first user equipment.

7. The system of claim 1, wherein the first category comprises an internet of things category.

8. The system of claim 1, wherein the operations further comprise:

determining location data indicative of a geographical location of the access point, and wherein determining the spectrum allocation data comprises determining the spectrum allocation data based on the location data.

9. The system of claim 1, wherein the determining comprises determining the spectrum allocation data based on timing data.

10. The system of claim 1, wherein the determining comprises assigning, during a defined time period, traffic, associated with the first category, to the first carrier frequency of the respective carrier frequencies.

11. A method, comprising:

analyzing, by a system comprising a processor, statistical data that has been determined based on monitoring usage data indicative of usage of access network resources by user equipment that are coupled to network equipment; and based on a result of the analyzing, facilitating, by the system, an allocation of respective carrier frequencies to specified categories of the user equipment based on location data indicative of a location of the network equipment, wherein the specified categories of the user equipment comprise a first group of user equipment associated with a first equipment category and a second group of user equipment associated with a second equipment category, wherein a first carrier frequency of the respective carrier frequencies is to be utilized by the first group of user equipment to communicate with a serving access point and a second carrier frequency of the respective carrier frequencies is to be utilized by the first group of user equipment to communicate with the serving access point, and based on a change in a demand for usage of spectrum resources by the first group of user equipment or the second group of user equipment, reallocating spectrum to the first group of user equipment and from the second group of user equipment, wherein the facilitating comprises facilitating a first allocation of a first frequency band to the first equipment category, of the specified categories of the user equipment, within a first location and facilitating a second allocation of a second frequency band to the first equipment category of the user equipment within a second location.

12. The method of claim 11, further comprising:

determining, by the system, mapping data that is employable to map a carrier frequency of the respective carrier frequencies to a specified network slice usable via communication network.

13. The method of claim 12, wherein the specified network slice has been customized to handle traffic associated with the carrier frequency.

14. The method of claim 12, further comprising:

directing, by the system, the mapping data to the network equipment to facilitate steering of traffic received via the carrier frequency to the specified network slice.

15. The method of claim 11, wherein the statistical data is determined based on device density data that represents a first density of the first group of user equipment and a second density of the second group of user equipment.

16. The method of claim 11, further comprising:

transmitting, by the system, a message to a first user equipment of the user equipment, and wherein the message comprises an instruction that instructs the first user equipment to utilize a specified carrier frequency of the respective carrier frequencies that corresponds to a category to which the first user equipment is determined to belong; and directing, by the system to an internet of things control center device, the allocation of respective carrier frequencies that are employable to facilitate a transmission of the message from the internet of things control center device to the first user equipment.

17. The method of claim 11, wherein the facilitating comprises assigning, during a defined time period, traffic, associated with the first equipment category, to the first carrier frequency of the respective carrier frequencies.

18. A non-transitory machine-readable medium, comprising executable instructions that, when executed by a processor, facilitate performance of operations, comprising:

monitoring usage data indicative of usage of access network resources by user equipment that are coupled to network equipment;

based on an analysis of the usage data, determining spectrum allocation data that is employable to allocate respective carrier frequencies for specified types of the user equipment, wherein the specified types comprise a first specified type and at least a second specified type, wherein a first carrier frequency of the respective carrier frequencies is to be utilized by first user equipment that comprise the first specified type to communicate with the network equipment and a second carrier frequency of the respective carrier frequencies is to be utilized by second user equipment that comprise the second specified type to communicate with the network equipment;

reallocating spectrum from the first user equipment to the second user equipment based on a detected change in usage of spectrum resources by at least one of the first user equipment or the second user equipment;

facilitating a transmission of a message to the first user equipment, wherein the message comprises an instruction that instructs the first user equipment to utilize a specified carrier frequency of the respective carrier frequencies that corresponds to a category to which the first user equipment is determined to belong; and directing, to an internet of things control center device associated, the spectrum allocation data that is employable to facilitate the transmission of the message from the internet of things control center device to the first user equipment.

19. The non-transitory machine-readable medium of claim 18, wherein the specified types of the user equipment comprise an internet of things device type.

20. The non-transitory machine-readable medium of claim 18, wherein the determining comprises determining the spectrum allocation data based on location data indicative of a geographical location of the network equipment.

* * * * *